United States Patent [19]

Reitmeier et al.

[11] 4,334,237
[45] Jun. 8, 1982

[54] ADAPTIVE AMPLITUDE AVERAGING FOR WEIGHTING QUANTIZING NOISE

[75] Inventors: Glenn A. Reitmeier, Trenton; Robert A. Dischert, Burlington, both of N.J.

[73] Assignee: RCA Corporation, New York, N.Y.

[21] Appl. No.: 149,998

[22] Filed: May 15, 1980

[30] Foreign Application Priority Data

Feb. 7, 1980 [GB] United Kingdom ............... 8004196

[51] Int. Cl.³ .............................................. H04N 5/21
[52] U.S. Cl. ..................................... 358/36; 358/167; 375/26
[58] Field of Search ................... 358/36, 37, 166, 167, 358/160, 21 R, 133, 137, 138; 375/25, 26, 27, 99, 103, 34; 455/296, 307

[56] References Cited

U.S. PATENT DOCUMENTS

3,699,446 10/1972 Sainte-Beuve ........................ 375/26
4,095,259 6/1978 Sawagata .............................. 360/36

OTHER PUBLICATIONS

Digital Techniques for Reducing Television Noise, Rossi SMPTE, Journal; Mar. 78, vol. 87, pp. 134–140.
A Digital Noise Reducer for Encoded Ntsc Signals, McMann, SMPTE Journal; Mar. 78, vol. 87, pp. 129–133.
PCM Encoded NTSC Color Television Subjective Tests, Goldberg TSMPTE, Aug. 73, pp. 649, 654.

*Primary Examiner*—Michael A. Masinick
*Attorney, Agent, or Firm*—Paul J. Rasmussen; Henry I. Steckler; William H. Meise

[57] ABSTRACT

An apparatus reduces quantizing noise by averaging picture information when only low frequency information is present. Thus, high frequency detail is not lost. This is determined by looking at proximate samples to see if their amplitudes are within a selected amount of each other. The averaging typically is of two or four picture samples depending upon how great an area has only low frequencies, but greater numbers of samples can be used.

24 Claims, 15 Drawing Figures

ADAPTIVE AMPLITUDE AVERAGING SYSTEM

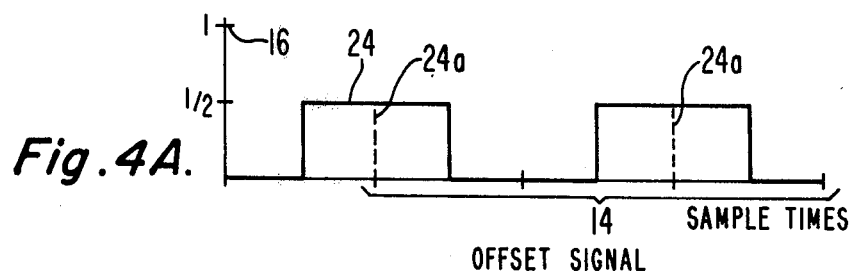
Fig.4A. OFFSET SIGNAL
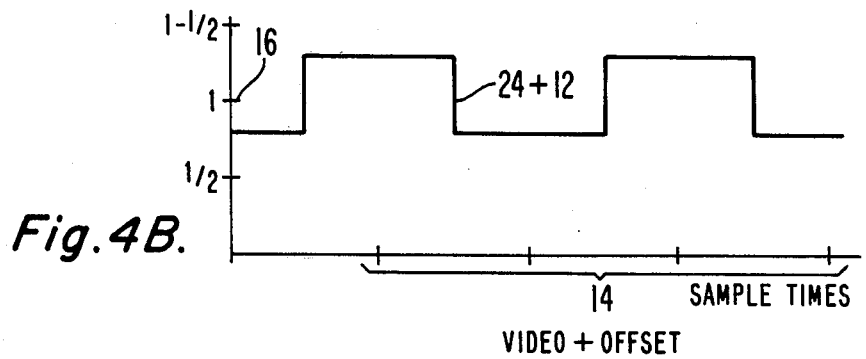
Fig.4B. VIDEO + OFFSET
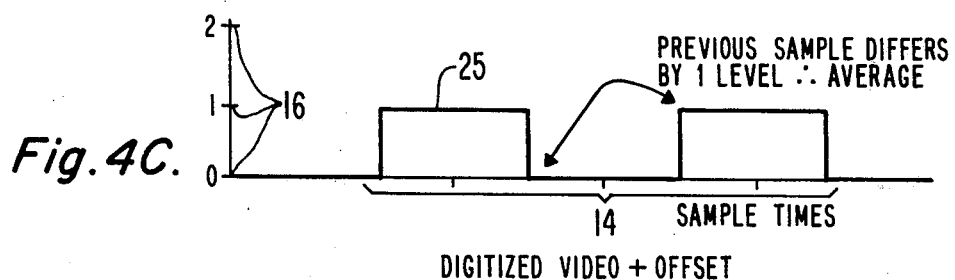
Fig.4C. DIGITIZED VIDEO + OFFSET
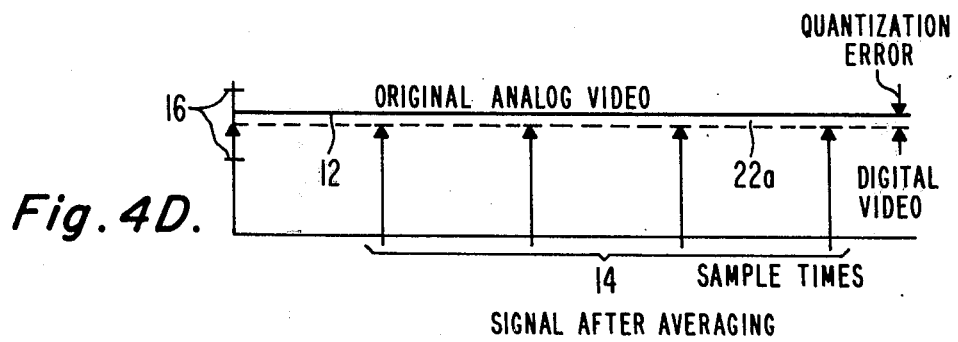
Fig.4D. SIGNAL AFTER AVERAGING

ADAPTIVE AMPLITUDE AVERAGING FOR WEIGHTING QUANTIZING NOISE

BACKGROUND OF THE INVENTION

The present invention relates to digital television, and more particularly, to processing that reduces quantizing noise.

In digital video, when too few bits are used to quantize each sample of the video waveform, quantization noise is large and causes objectionable contouring or "puddling" of the displayed picture. This is most objectionable in areas of gradual intensity changes where the slope of the video waveform is small compared to the quantization step size. This is because in such slowly changing, low frequency portions, of the picture, the eye is most sensitive to quantization noise. By increasing the number of bits per sample, more levels are available for quantization, and the gradual change is more closely represented. However, the use of more bits per sample results in the penalty of a corresponding increase in the required data rate of the digital video. It is known from the article entitled "PCM Encoded NTSC Color Television Subjective Tests" by A. A. Goldberg, JSMPTE, August, 1973, p.p. 649–654, to add either a square wave or a random signal to the video signal before quantization to reduce contouring, and then low pass filtering the reproduced analog video signal to reduce the visibility of the added signal and the quantizing noise. However in this system, the low pass filter also reduces the high frequency video signal information.

It is therefore desirable to reduce the visability of contouring, and quantizing noise without increasing the data rate and without reducing the high frequency video signal information.

SUMMARY OF THE INVENTION

This is achieved by determining if said digital signal has only low frequency information, and filtering proximate samples of said signal if only low frequency information is present to reduce the noise content of said signal.

DESCRIPTION OF THE DRAWINGS

FIG. 4A through D show various waveforms concerning a flat field using amplitude averaging in accordance with the present invention;

DETAILED DESCRIPTION

Figure 1:
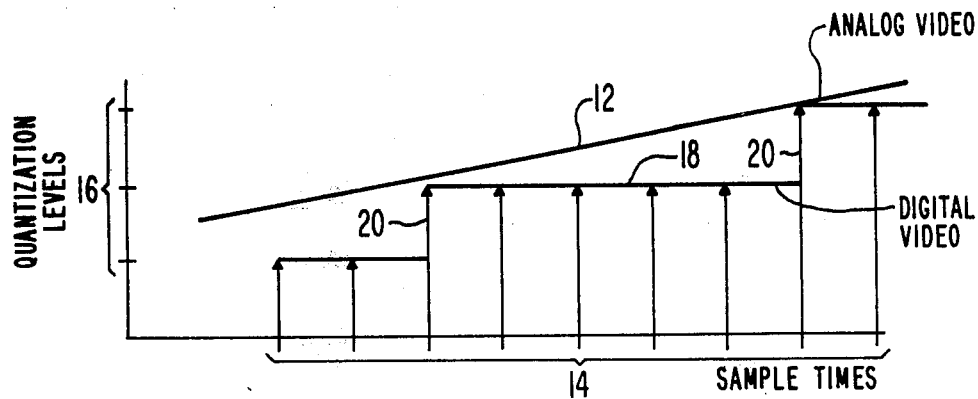
FIG. 1 shows a gradually changing video signal quantized using only a few levels.

FIG. 1 shows a graph of an analog video signal 12 which is sampled at a fixed sampling frequency at sampling points of times 14 and quantized to the next lowest of various quantizing levels 16. The result is a digital waveform 18. The difference between analog signal 12 and digital signal 18 is the quantizing error, which can be as great as one quantizing level. Because the slope of the waveform 12 changes slowly with respect to the difference between quantizing levels 16, sharp edges 20 occur in the digital waveform which are separated from each other by some considerable distance along the horizontal axis by a constant amplitude signal. The result is highly visible contours in the picture display from signal 18.

Figure 2:
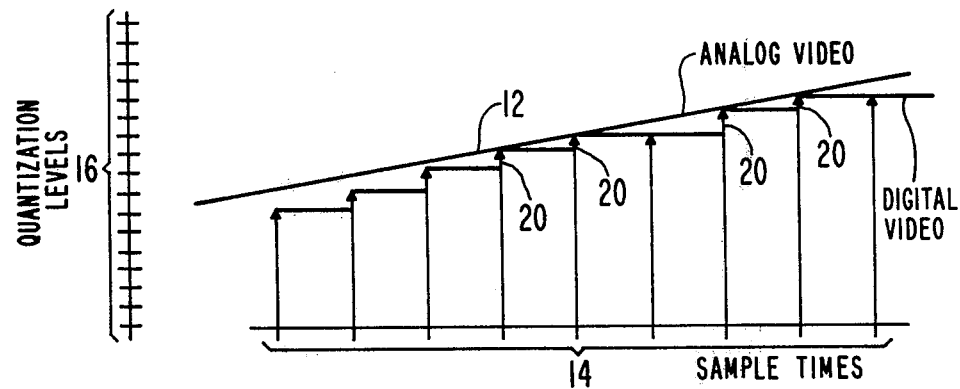
FIG. 2 shows the same signal with more quantizing levels.
Figure 3:
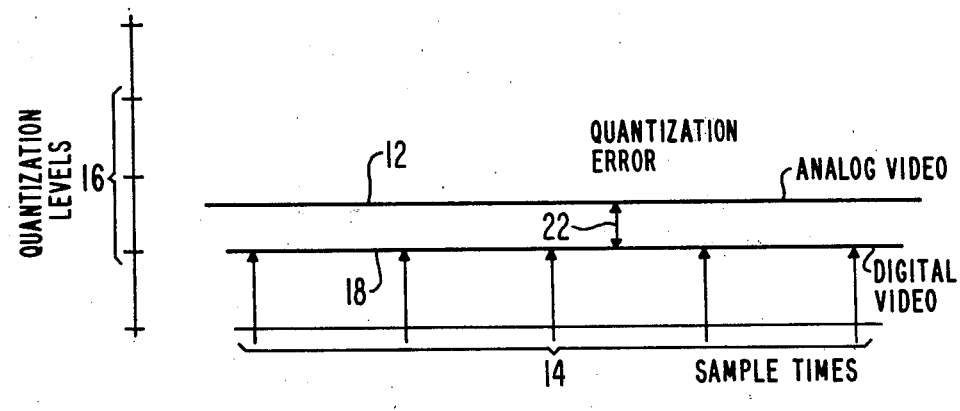
FIG. 3 shows a flat field with coarse quantization.

FIG. 2 shows a graph where the number of quantizing levels have been increased and where corresponding reference numerals have been applied to corresponding elements of the graph. It will be noted that the steps 20 are much smaller in amplitude and occur more frequently than is the case in FIG. 1, resulting in a smaller quantizing error. However, increased quantizing levels require an increased data rate. Consider the situation in FIG. 3 where again corresponding portions of the graph have been given corresponding reference numerals. It will be seen that due to the small number of the quantizing levels 16, there is a fixed quantizing error 22, if the analog video signal 12 is flat and occurs between quantizing levels as shown in FIG. 3.

FIG. 4A shows a signal which can help overcome these problems. An offset signal 24 is shown which has a square wave shape, a frequency equal to one-half the sampling frequency used, and a peak amplitude equal to one-half of the amplitude difference between adjacent quantizing levels. Note that center of the upper portion of the square wave 24a coincides with every other sampling point 14. FIG. 4B shows the results when this offset signal 24 is added to an analog video signal 12 having a constant amplitude of $\frac{3}{4}$ of a quantizing level before the quantizing step. Note that in FIG. 4B, the amplitude of adjacent samples alternates up and down by one-half of a quantizing level. FIG. 4C shows the result of the signal of FIG. 4B after quantization. This signal 25, in the case shown, exists only at the discrete quantizing levels 0 and 1 and adjacent signals do not differ from each other by more than one quantizing level. This being the case, and in accordance with the invention, the signal 25 is integrated or averaged, either by the eye or electronically, to give the result shown in FIG. 4D, if the averaging is done electronically. The result is a signal level half-way between two quantization levels. This holds true for any value of the analog video signal 12 lying in the upper half of any quantizing range, e.g. between one-half and one, one and one-half and two, two and one-half and three, etc. For a value of signal in the lower half of a quantizing range, e.g. zero and one-half, one and one-half, two and two and one-half, etc., the combined video and offset signal will always be quantized at the lower end of the range, e.g. zero, one, two, respectively, etc. In either case, after the integration or averaging is performed, the maximum quantizing error is one half of quantizing step, instead of the maximum error of one step as discussed above in connection with FIG. 1. This corresponds to an effective doubling of the number of quantization levels without adding an extra one bit per sample, which can be used for representing slowly changing information. For high frequency information, the maximum error is increased to one and one-half levels (one original level plus one-half level from the offset signal) since these signals cannot be averaged. However, as explained above, noise in high frequency portions of the signal is less objectionable than in low frequency portions.

The concept described above can be extended to averaging more than two samples to obtain more low frequency amplitude resolution. For example, two line alternating synchronous offset signals each having two levels that differ from the levels in the other signal, for a total of four levels (each level corresponding to one-quarter of a quantizing step) might be added to the analog video signal before quantization. Under the conditions that four adjacent samples are all no more than one quantizing level apart, an averaging of the four would produce one of four possible amplitude levels, three intermediate amplitude levels e.g. one-quarter, one-half, three-quarters of a quantizing step and one quantizing level. This is the equivalent of adding two bits per sample. If the condition is not met that the four adjacent samples differ by not more than one quantizing level, two adjacent pixels can be examined. If the two pixels are not more than one level apart, they can be averaged to provide one additional bit of amplitude resolution per sample. If the condition that two adjacent pixels differ by no more than one level is not met either, then the picture content is a high frequency signal, i.e. a sharp transition, where quantization error is not an important factor.

While the aforementioned added signal is helpful in explaining the invention, the invention is not so limited. When the quantizing steps are small compared to the noise in the input video signal, no offset signal is required. Basically, the invention comprises adaptive filtering or averaging of mutual proximate signal samples.

Figure 5:
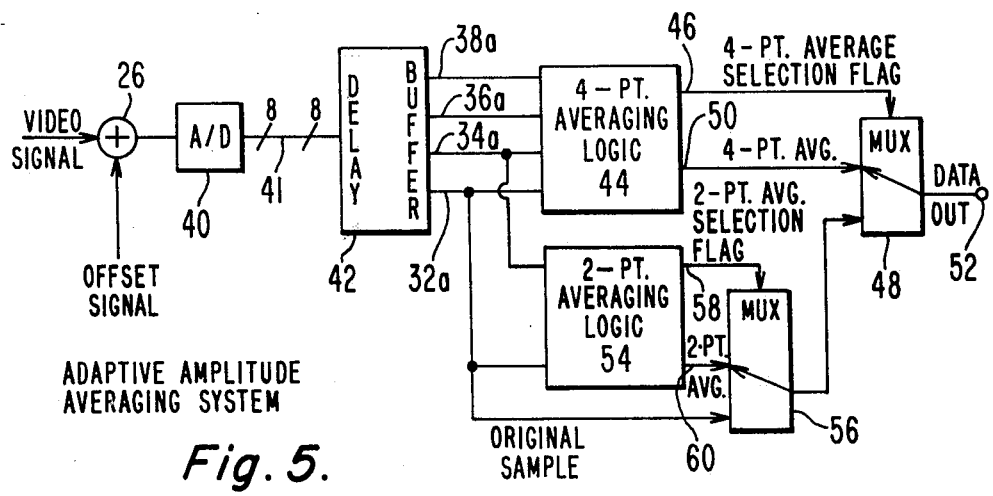
FIG. 5 shows in block diagram form an adaptive amplitude averaging system.
Figure 6:
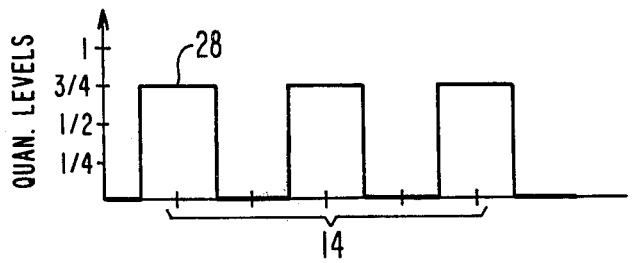
FIGS. 6 and 7 show some waveforms used in the system of FIG. 5.
Figure 7:
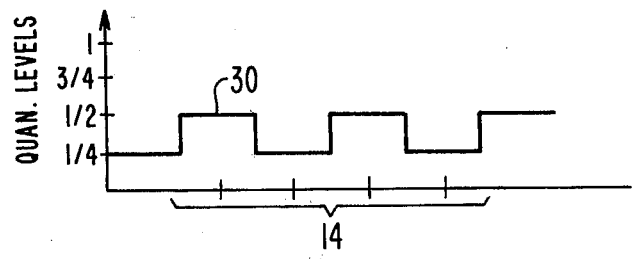
Figure 8:
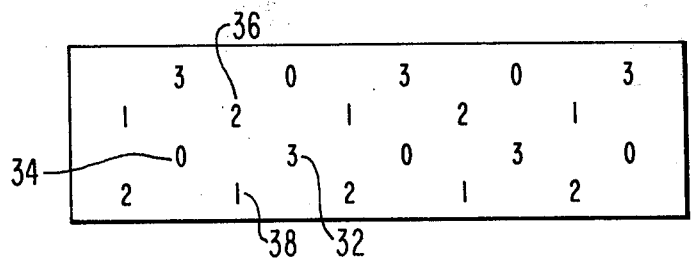
FIG. 8 shows a diagram for use in explaining FIG. 5.

An example of a system for carrying out the above operations is shown in FIG. 5. An analog video signal is fed into one input of adder 26, while offset signals are applied in a line-alternate fashion to its other input. These offset signals are shown in FIGS. 6 and 7. During alternate lines, an offset signal 28, such as shown in FIG. 6, is applied to the adder 26. It alternates between amplitudes of zero and three-quarters of the difference between adjacent quantization levels. During the remaining alternate lines, the signal 30 of FIG. 7 is applied to adder 26. It has an amplitude that alternates between one-quarter and one-half that of the difference between adjacent quantization levels. These signals 28 and 30 occur at one-half the rate of the sampling frequency with a phase shift of 90° therebetween. As shown in FIGS. 6 and 7, the sampling clock has a 180° phase shift from line to line, thus shifting the sample points 14 from line to line. Further, there is a 180° phase shift of each of the offset signals 28 and 30. These phase shifts occur every time the respective signals start a new horizontal line. The portion of the output signal from adder 26 due to signals 28 and 30 is shown diagramatically in FIG. 8 which shows a portion of a raster. The quantizing levels that have been added to the analog video signal by adder 26 are shown in FIG. 8 expressed in quarters of a quantizing level. Note that these numbers represent the additional levels and not the absolute value of the digital signals coming out of adder 26. In the following discussion, the sampling point 32 will be considered as the one currently under consideration, and reference will be made to the proceeding point 34 on the same line, a point 36 on the line above, and a point 38 on the line below. The analog video signal plus the additional quantizing levels are applied to an analog to digital converter 40, which in turn applies an 8 bit digital representation of the sum of said analog video signal and the additional levels through a transmission path 41 to a delay buffer 42. This 8 bit buffer 42 supplies at each of its outputs 32a, 34a, 36a, 38a, 8 bit signals representing the amplitude of the signal occurring at the various sample points 32, 34, 36 and 38 respectively. The outputs are denominated using corresponding reference numbers with the suffix "a" added to indicate which points appear at which outputs. All of the outputs of buffer 42 are applied to four point averaging logic circuit 44. This circuit supplies at an output 46 a flag signal when all four points 32, 34, 36, and 38 are not more than one quantizing step different in amplitude from each other. Output 46 supplies the flag as a control signal to MUX 48, which comprises a SPDT switch. The switch is in the position shown, when the above condition is true, so that an average of the amplitudes of the four points 32, 34, 36, 38 is supplied by output 50 of logic circuit 44 and is applied to data output 52 by MUX 48. The signal at outputs 50 and 52 has the resolution of a 10 bit signal, which reduces contouring without increasing the data rate through transmission path 41. If all four of said points are not within one quantizing level difference of each other, then there is no four point average selection flag signal at output 46, and hence MUX 48 is switched to its lower position, and thus receives the output of MUX 56, which also comprises a SPDT switch. Signals representing points 32 and 34 from outputs 32a and 34a are applied to two point averaging logic circuit 54, and if these points are within one quantizing level step of each other, a two point average flag selection signal is applied from output 58 to MUX 56, so that it is in the position shown. In this case, output 60 supplies a signal representing the actual two point average of points 32 and 34 to MUX 48 by way of MUX 56, and hence to data output 52. This gives the resolution of a 9 bit signal. In the event that points 32 and 34 are not within one quantizing level step of each other, then no two point average selection flag signal is present at output 58, and hence MUX 56 is in the lower position (not shown, just the signal representing point 32 is applied through MUX 56 and MUX 48 to data output 52, which signal is an 8 bit one.

Figure 12:
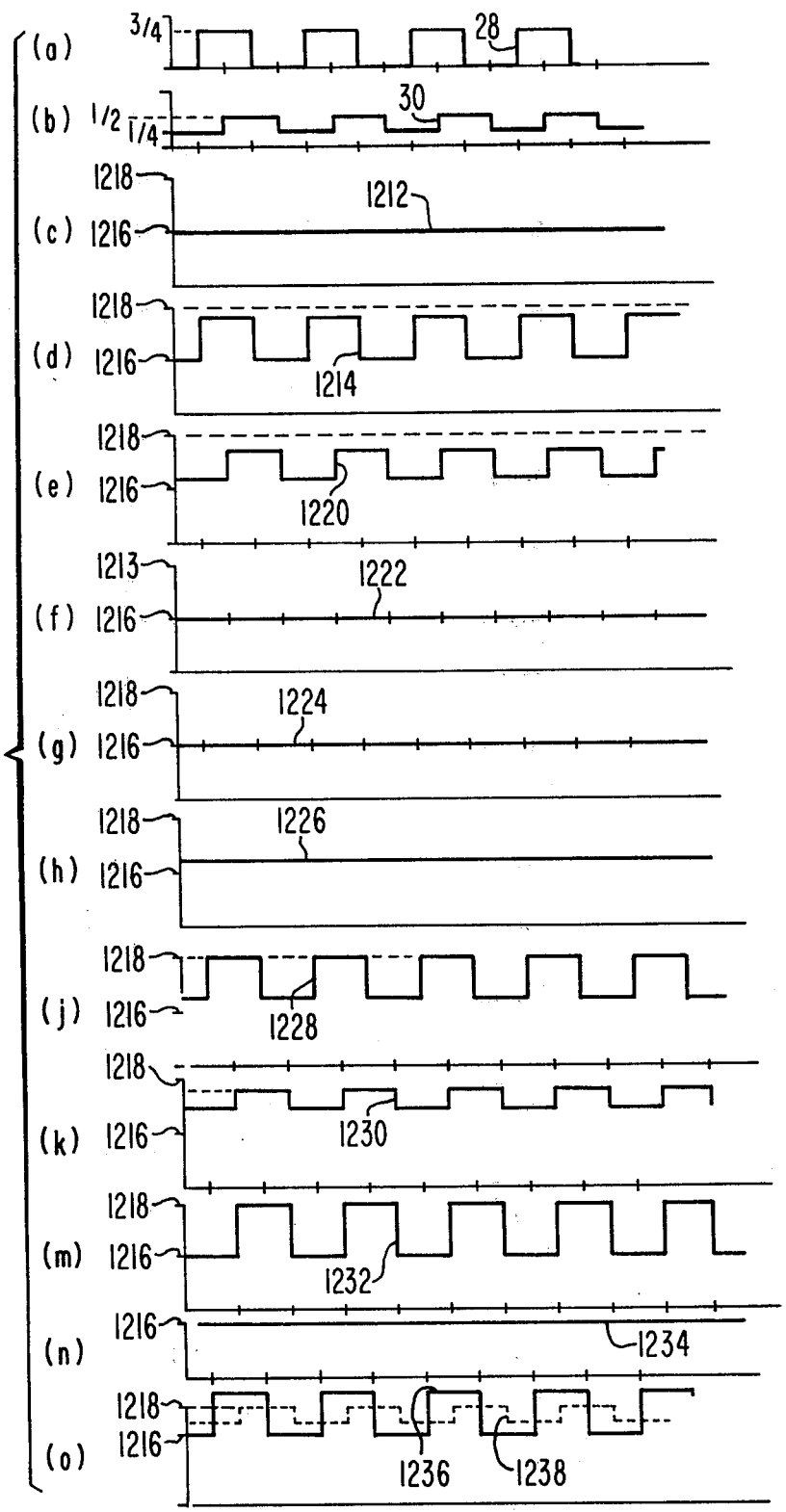
FIG. 12 shows in more detail waveforms of the present invention.

The line alternate added offset signals 28 and 30 of FIGS. 6 and 7 are repeated in FIGS. 12a and b. In operation on an analog signal 1212 as illustrated in FIG. 12c having a relatively constant amplitude lying at a quantizing level 1216, the arrangement of FIG. 5 produces during a first horizontal line a summed signal illustrated as 1214 of FIG. 12d, representing the sum of signals 28 and 1212. During the next horizontal line, sum signal 1220 is produced representing the sum of signals 30 and 1212. Where quantized, signal 1214 will take on a digital value equal to digitizing level 1216 at each sample point as illustrated by signal 1222 of FIG. 12f, for analog signal 1214 never reaches quantizing level 1218. Similarly, signal 1224 in FIG. 12g represents the digital value resulting from the digitizing of signal 1220. Signal 1224 also remains at quantizing level 1216, for signal 1220 does not reach the next quantizing level 1218. The time average of signals 1222 and 1224 equals quantizing level 1216, and consequently the digital value is a close approximation to the analog values.

FIGS. 12h–12o illustrate the conditions when the input analog signal takes on a value lying slightly above quantizing level 1216, as illustrated by signal 1226 of FIG. 12h. Signal 1226 lies above quantizing level 1216 by ¼ of a quantizing level. If signal 1226 were simply quantized as in the prior art, the quantizing error would be ¼ of a quantizing level. Signal 1228 in FIG. 12j illustrates the sum of offset signal 28 and analog signal 1226 as generated by the apparatus of FIG. 5. It should be noted that signal 1228 reaches the next higher quantizing level 1218 at alternate sampling points. Signal 1230 of FIG. 12k represents the sum of signal 30 and signal 1226. Since signal 1226 is only ¼ of a quantizing level above level 1216 and the maximum amplitude of signal 30 with which it is summed is ½ quantizing level, signal 1230 does not reach next higher quantizing level 1218. The result of quantizing signal 1228 is illustrated as signal 1232 of FIG. 12m and the result of quantizing signal 1230 is illustrated as signal 1234 in FIG. 12n. The time average of the digital sum of digital signals 1232 and 1234 produced by the arrangement of FIG. 5 is ¼ of a quantizing level above level 1216, which is exactly the value of analog signal 1226. Thus, in this case the quantizing error has been reduced from ¼ of a level to zero.

If the analog signal applied to the arrangement of FIG. 5 lies half-way between quantizing levels 1216 and 1218, the sum signals are as illustrated by waveforms 1236 and 1238, illustrated together in FIG. 12o. It will be apparent that sum waveform 1236 when digitized will be identical with signal 1232 but for a phase shift, with half its dwell time at level 1216 and the other half at 1218. Signal 1238 similarly will, when digitized, assume a digital value identical to signal 1232. When summed in the apparatus of FIG. 5, the output signal will assume a time-average value half-way between levels 1216 and 1218. This is exactly equal to the value of the input analog signal, and results in zero digitizing error.

If the input signal has a magnitude lying ¼ digitizing level below level 1218, the digitizing error would be expected to be ¾ of a digitizing level. When summed with signal 28, the sum dwells half the time above level 1218 and half the time below. The sum with signal 30 remains at all times at or above level 1218. When digitized and time averaged, the output signal will be ¼ level below level 1218, whereby the digitizing error is reduced to zero.

Figure 9:
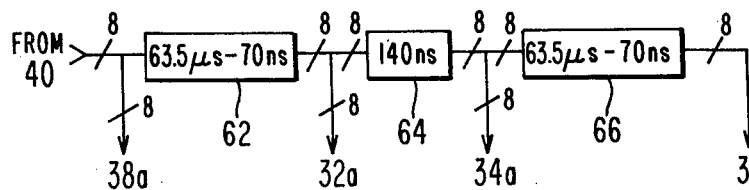
FIG. 9 shows the details of a delay buffer used in FIG. 5.

FIG. 9 shows an embodiment of the delay buffer 42. The 8 bit input signal from quantizer 40 is applied to output 38a directly and to a 63.5 microseconds (one horizontal line) minus 70 nanosecond delay line 62. The output of delay line 62 comprises output 32a and is also applied to delay line 64, which has a delay of 140 nanoseconds. The output of delay line 64 is applied to output 34a and also to delay line 66 which has a delay of 63.5 microseconds minus 70 nanoseconds. The output of delay line 66 comprises output 36a. It should be noted that all of the above delays are for a 525 lines per frame, 30 frames per second system and for a sampling frequency of 7.16 MHz. The 70 nanosecond delays are needed to achieve a shift of one half of a sample interval with said sampling frequency, which is needed due to the phase shift between signals 28 and 30. Other systems would use other values of delay for the delay lines 62, 64 and 66.

Figure 10:
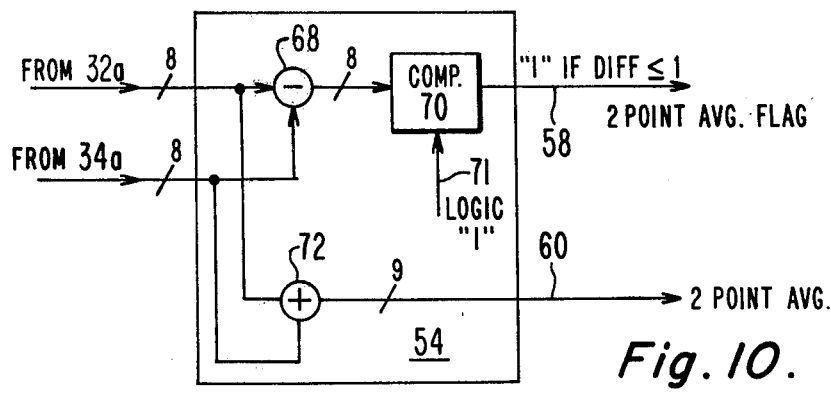
FIG. 10 shows the details of two point averaging logic circuit used in FIG. 5.

FIG. 10 shows a detailed diagram of the two point averaging logic circuit 54. The signal from output 32a of delay buffer 42 is applied to an input of subtractor 68, while the signal at output 34a is applied to another input of subtractor 68. A difference signal is present at the output of subtractor 68 and is applied to one input of a digital comparator 70, that has applied at another input a logic "1" signal present on line 71. The comparator 70 supplies at output 58 a logic "1" signal if the difference applied between its two inputs is less than or equal to one, and a logic "0" if otherwise. This signal is the beforementioned two point average selection flag. Signals at outputs 32 and 34a are also applied to adder 72 and their sum, which comprises the two point average is applied to output 60.

Figure 11:
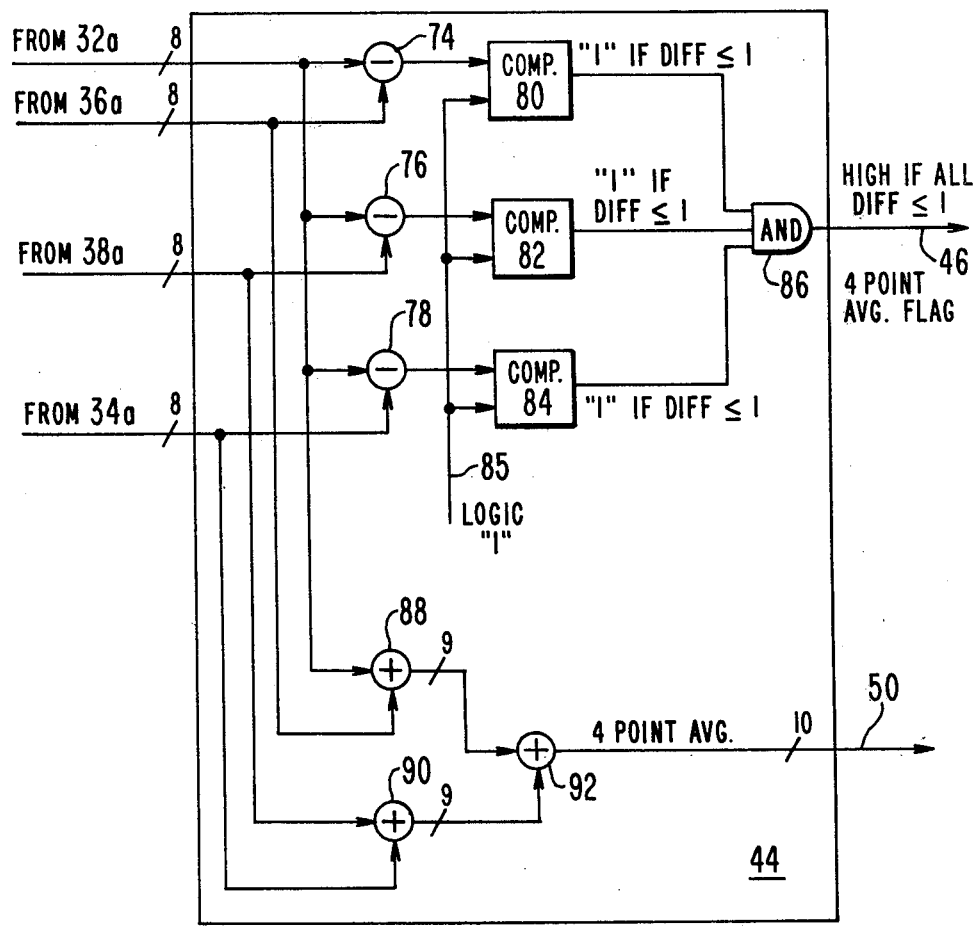
FIG. 11 shows the details of a four point averaging logic circuit used in FIG. 5.

FIG. 11 shows the details of the four point averaging logic 44. Signals from outputs 32a, 34a, 36a and 38a are applied to the circuit 44. The signal from 32a is applied to all of the subtractors 74, 76 and 78. The signal from 36a is applied to subtractor 74, which applies the difference between that signal and that from output 32a to digital comparator 80. This comparator supplies the logic level "1", if the difference between its input signals is less than or equal to one, to AND gate 86. The signal from output 38a is applied to subtractor 76, which supplies the difference between that signal and that from output 32a to comparator 82. Comparator 82 supplies an output signal, if this difference is less than or equal to one, to AND gate 86. The signal from output 34a is applied to subtractor 78 and the difference between that signal and that from output 32a is applied to digital comparator 84. If the difference is less than or equal to one, a logic one signal is applied to AND gate 86. It will be noted that a logic one signal is applied to the digital comparators 80, 82 and 84 from line 85 so they can make the proper comparison. If the difference is less than or equal to one from all of the comparators 80, 82 and 84, AND gate 86 supplies a high signal, which comprises the four point average flag, at output 46. The signals from outputs 32a and 36a are applied to adder 88, which in turn supplies their sum to one input of adder 92. The signals from outputs 38a and 34a are applied to adder 90, which in turn applies to their sum to another input of adder 92. Thus output of adder 92 comprises the ten bit four point average signal which is present at output 50.

It will be appreciated that variations are possible within the scope of the invention. For example, the point to the right of point 32 can be used to derive the two point average, and points to the upper and lower right of point 32 can be used to derive the four point average. Other combinations of surrounding samples can be used. Further, the concept can be extended to 8 or more point averaging. If the input video signal is already a digital signal, then converter 40 will be just a quantizer for requantization after the addition of offset signals by adder 26. Still further, the use of 180 degree phase shift from line to line in the sampling frequency is not required. It was used in a preferred embodiment which is used together with the invention disclosed in U.S. application Ser. No. 132,137, filed Mar. 20, 1980, now abandoned, filed in the name of the same inventors as this invention. The offset signal if used need not be synchronous with the sampling signal, but this may generate interference signals.

What is claimed is:

1. A method for reducing quantizing noise in a sampled quantized signal, said method comprising adding a periodic multilevel offset signal to said sampled signal prior to quantization, quantizing said signal, determining if only low frequency information is present, averaging a plurality of samples when only low frequency information is present, every plurality of averaged samples having the same average value of offset signal amplitude, whereby additional quantizing levels between the original levels are recovered in the averaged samples, thereby reducing quantizing noise.

2. A method as claimed in claim 1 wherein said determining step comprises comparing at least two proximate samples to determine if their amplitudes are within a selected amount of each other.

3. A method as claimed in claim 2 wherein said comparing step comprises comparing four proximate samples.

4. A method as claimed in claim 3 wherein said averaging step comprises averaging at least four proximate samples if said four samples are within said selected amount of each other and if not, then averaging two proximate samples if said two samples are within said selected amount of each other.

5. A method as claimed in any of claims 2, 3, or 4, wherein said selected amount comprises one quantizing step.

6. A method as claimed in claim 5 wherein said averaging step comprises averaging four proximate samples.

7. A method as claimed in claim 1 wherein said averaging step comprises averaging at least two proximate samples.

8. A method as claimed in claim 1 wherein said offset signal is synchronous with the sampling frequency.

9. A method as claimed in claim 8 wherein said offset signal comprises a square wave having a frequency equal to one half of said sampling frequency.

10. A method as claimed in claim 9 wherein said sampled signal comprises a television signal having scanning lines and said offset signal has a 180° phase shift from line to line.

11. A method as claimed in claim 10 wherein said offset signal has line alternating peak to peak amplitudes of one quarter and three quarters of the quantizing steps.

12. A method as claimed in claim 1, wherein said sampled signal comprises a television signal having scanning lines and said offset signal comprises a square wave having different peak amplitudes on adjacent lines and the same average amplitude on adjacent lines.

13. An apparatus for reducing quantizing noise in a sampled quantized signal, said apparatus comprising means for adding a periodic multilevel offset signal to said signal prior to quantization, means for quantizing said signal, means for determining if only low frequency information is present, means for averaging a plurality of samples when only low frequency information is present, every plurality of averaged samples having the same average value of offset signal amplitude, whereby additional quantizing levels between the original levels are recovered in the averaged samples, thereby reducing quantizing noise.

14. An apparatus as claimed in claim 13 wherein said determining means comprises means for comparing at least two proximate samples to determine if their amplitudes are within a selected amount of each other.

15. An apparatus as claimed in claim 14 wherein said comparing means compares four proximate samples.

16. An apparatus as claimed in claim 15 wherein said averaging means comprises means for averaging at least four proximate samples if said four samples are within said selected amount of each other.

17. An apparatus as claimed in any of claims 14, 15, or 16, wherein said selected amount comprises one quantizing step.

18. An apparatus as claimed in claim 13 wherein said averaging means comprises means for averaging at least two proximate samples.

19. An apparatus as claimed in claim 18 wherein said averaging means comprises means for averaging four proximate samples.

20. An apparatus as claimed in claim 13 wherein said offset signal is synchronous with the sampling frequency.

21. An apparatus as claimed in claim 20 wherein said offset signal comprises a square wave having a frequency equal to one half of said sampling frequency.

22. An apparatus as claimed in claim 21 wherein said sampled signal comprises a television signal having scanning lines, and said offset signal has a 180° phase shift from line to line.

23. An apparatus as claimed in claim 22 wherein said offset signal has line alternating peak to peak amplitudes of one quarter and three quarter of the quantizing steps.

24. An apparatus as claimed in claim 13, wherein said sampled signal comprises a television signal having scanning lines and said offset signal comprises a square wave having different peak amplitudes on adjacent lines and the same average amplitude on adjacent lines.

* * * * *